March 8, 1949.    J. W. MYERS    2,464,147
HEATING UNIT
Filed Dec. 4, 1945
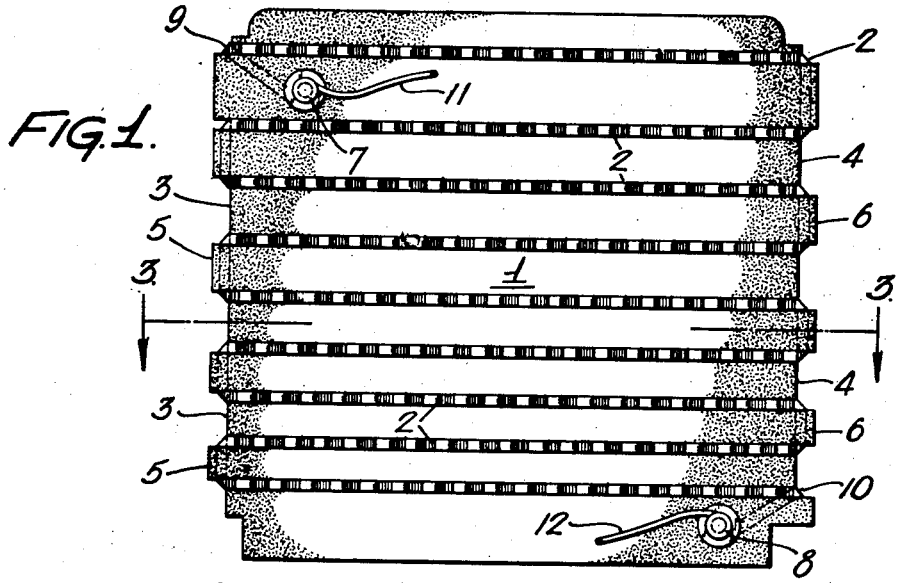
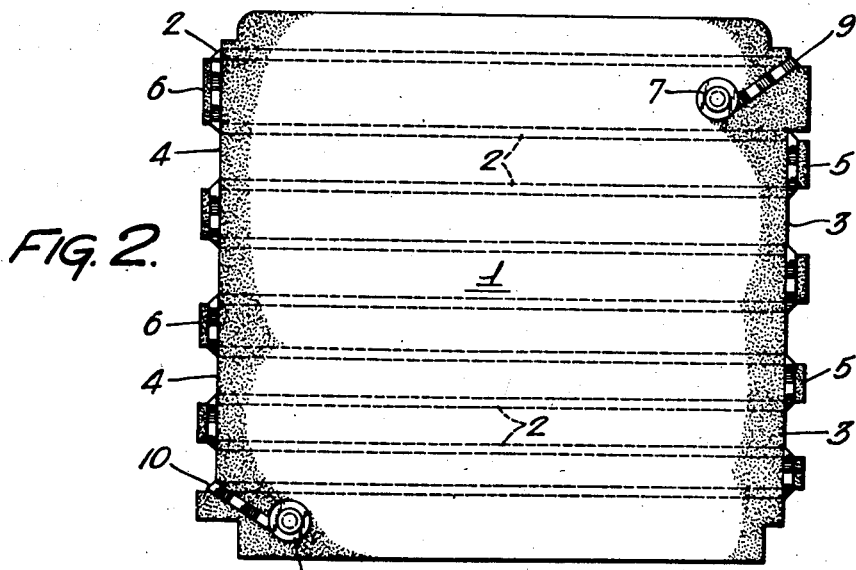
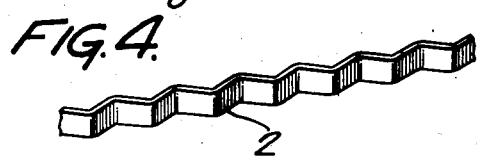
Inventor:
Joseph W. Myers
by his Attorneys
Howson & Howson Patented Mar. 8, 1949

2,464,147

UNITED STATES PATENT OFFICE 2,464,147

HEATING UNIT

Joseph W. Myers, Philadelphia, Pa., assignor, by mesne assignments, to Proctor Electric Company, Philadelphia, Pa., a corporation of Pennsylvania Application December 4, 1945, Serial No. 632,748

4 Claims. (Cl. 201—74)

This invention relates to electrical heating units, and more particularly to units of the type comprising a resistance wire or ribbon wound on an insulating support of predetermined dimensions. The invention is directed especially to toaster heating units wherein a heating element in the form of a ribbon is wound back and forth on a flat insulating support such as a mica plate. However, the invention is not restricted to such units but is applicable in any instance in which it may find useful application.

In toasters of the type which are adapted to toast both sides of a bread slice at the same time, it is important that the heat output of the heating units be carefully balanced to secure uniform toasting of both sides of the bread. This requires that each unit have its electrical resistance carefully controlled. An example of such a toaster is the modern household toaster having a well in which a bread slice is inserted, and having a heating unit on each side of the well to toast both sides of the bread slice at the same time. The balancing of these heating units has been difficult because of the unavoidable commercial variations in the resistance per unit length of the nickel-chromium ribbon commonly employed, which comes wound on spools. The resistance varies from spool to spool, and even varies along the length of the ribbon on a single spool. Since the insulating supports, on which the ribbon is wound to form the heating units, are of predetermined fixed dimensions so as to receive a predetermined length of ribbon, considerable difficulty has been encountered due to the fact that a piece of ribbon having the required resistance is frequently of a different length than the said predetermined length.

The principal object of the present invention is to overcome this difficulty and to provide an improved heating unit which will insure the proper length of the heating element.

Another object of the invention is to provide a novel method of constructing a heating unit of the type here involved.

A further object of the invention is to provide a novel heating element which is adapted to be varied in length without altering its cross-section or resistance, so that the said element may be made to fit a support with which it is to be used.

Still another object of the invention is to provide a novel heating element in the form of a ribbon which is crinkled or crimped transversely over at least a portion of its length, whereby its length may be varied without altering its cross-section or resistance.

Reference may now be had to the accompanying drawing wherein a preferred form of the invention is illustrated, and in which Fig. 1 is a face view, on a small scale, of a toaster heating unit constructed according to the present invention;

Fig. 2 is a similar view of the opposite or rear side of the unit;

Fig. 3 is a sectional view taken along line 3—3 of Fig. 1; and

Fig. 4 is an enlarged perspective view of a portion of the heating element or ribbon.

Referring more particularly to the drawing, the heating unit comprises an insulating support 1 in the form of a rigid plate, and a heating element 2 wound thereon. As is customary in toaster heating units, the insulating support 1, which may be formed of mica or other suitable material, is constructed so that it will receive a heating element of predetermined length. To this end, the support 1 is provided with staggered recesses 3 and 4 at its opposite side edges to provide staggered projections 5 and 6 along said edges. The support is also provided with terminal elements 7 and 8 in the form of rivets or the like. One end of the heating element 2 is secured to the upper terminal element 7 at the rear of the supporting plate 1, as shown in Fig. 2, and the heating element extends around the edge of the supporting plate, as at 9, to the front of the plate, and it is wound back and forth across the front face of the plate, as shown in Fig. 1. This is accomplished by passing the heating element behind the projections 5 and 6, as clearly shown in Fig. 2. At the lower portion of the supporting plate the heating element is passed about the edge of the supporting plate, as at 10, and its end is secured to the lower terminal element 8 at the rear of the supporting plate, as shown in Fig. 2. The lead wires for supplying current to the heating element 2 are secured to the terminal elements 7 and 8, as shown at 11 and 12 in Fig. 1.

As previously mentioned it is necessary that the heating element have a predetermined resistance value in order that it shall have a predetermined heat output, and since the resistance ribbon commonly employed is subject to variation in resistance per unit length, considerable difficulty has been encountered in the past due to the consequent variation in length of pieces having the same resistance. For example, suppose that a given heating unit has a winding length of 5 feet, and that the correct resistance of the unit is 15 ohms or 3 ohms per foot. In the case of straight ribbon such as heretofore employed, the ribbon for this particular unit should have a resistance per unit length of exactly 3 ohms per foot. But, as previously stated, the resistance per unit length varies inevitably, and consequently a piece of ribbon having the required resistance of 15 ohms may have a length different from the required length of 5 feet.

In accordance with the present invention this difficulty is overcome by selecting the resistance ribbon according to a specified resistance per unit length such that a length having the required total resistance is greater than the winding length of the support, and by deriving the required winding length by crimping the ribbon. Thus, in the example assumed above, the specified length of the ribbon may be 5.5 feet, and the specified resistance per unit length may be 2,727 ohms per foot to give a total resistance of 15 ohms. The required length of 5 feet is obtained by crimping the ribbon. The variations in actual length, which are bound to occur due to variations of the resistance per unit length from the specified value, are now immaterial because the crimping enables attainment of the required length regardless of such variations.

The preferred procedure, in making a heating element for a particular support, is as follows: The straight ribbon having been chosen according to the specified resistance per unit length (2.727 ohms per foot in the above example), the ribbon is crimped to such an extent that the specified length (5.5 feet in the above example) will be decreased by the crimping to something less than the winding length of the particular support. The crimped ribbon is then cut to a length having the required total resistance (15 ohms in the above example), and the cut length of ribbon is then stretched sufficiently so that its length equals the winding length of the support. The crimping permits this stretching without altering the cross section of the ribbon or its resistance. The stretched-crimped ribbon is then wound on the support in the manner shown in Figs. 1 and 2 and described above.

An alternative and satisfactory procedure is to first cut the ribbon to a length having the required total resistance, and then crimp the cut ribbon to such an extent that its length is something less than the winding length of the support. The ribbon may then be stretched to the winding length, and then wound on the support.

Still another, but generally less satisfactory procedure is as follows: The ribbon is first cut to a length having the required total resistance, and then it is crimped to such an extent that its length is reduced to the winding length of the support. The crimped ribbon is then wound on the support.

Still another, but also less satisfactory procedure is as follows: The ribbon is first cut to a length having the required total resistance, and then it is crimped to such an extent that its length is reduced to slightly less than the winding length of the support. The crimped ribbon is then wound on the support, and at the same time it is stretched to the extent necessary to make it fit the support.

In either of the last two procedures, the cutting and crimping steps may be reversed, as will be apparent from the preferred procedure first described.

From the foregoing description, it will be seen that the invention adapts the heating element to the support by making the element fit the support regardless of variations in the actual length of the element due to variations in the resistance per unit length of the ribbon from which the element is formed. Thus, the invention completely overcomes the difficulty which has heretofore been encountered.

The crimping of the resistance ribbon may be performed in any suitable manner. For example, it may be performed by passing the ribbon through a suitable crimping device.

While the invention has been described with reference to a specific embodiment and its application to a toaster heating unit, it will be apparent that various modifications and other adaptations of the invention are possible without departing from the scope of the invention as defined in the appended claims.

I claim:

1. A method of making an electrical heating unit of the type in which a resistance element having a certain total resistance must be wound on a support having a certain winding length, which comprises selecting the resistance material according to a specified resistance per unit length such that a length having the required total resistance is greater than the said winding length, crimping and cutting the resistance material in either sequence, the extent of crimping being such as to reduce the length at least to the winding length, and winding the element on the support.

2. A method of making an electrical heating unit of the type in which a resistance element having a certain total resistance must be wound on a support having a certain winding length, which comprises selecting the resistance material according to a specified resistance per unit length such that a length having the required total resistance is greater than the said winding length, crimping and cutting the resistance material in either sequence, the extent of crimping being such as to reduce the length to something less than the winding length, stretching the resistance element thus formed to obtain the winding length, and winding the element on the support.

3. A method of making an electrical heating unit of the type in which a resistance ribbon having a certain total resistance must be wound on a support having a certain winding length, which comprises selecting the resistance ribbon material according to a specified resistance per unit length such that a length having the required total resistance is greater than the said winding length, crimping and cutting the resistance ribbon material in either sequence, the extent of crimping being such as to reduce the length at least to the winding length, and winding the ribbon on the support.

4. A method of making an electrical heating unit of the type in which a resistance ribbon having a certain total resistance must be wound on a support having a certain winding length, which comprises selecting the resistance ribbon material according to a specified resistance per unit length such that a length having the required total resistance is greater than the said winding length, crimping and cutting the resistance ribbon material in either sequence, the extent of crimping being such as to reduce the length to something less than the winding length, stretching the resistance ribbon thus formed to obtain the winding length, and winding the ribbon on the support.

JOSEPH W. MYERS.

REFERENCES CITED

The following references are of record in the file of this patent:

UNITED STATES PATENTS

| Number | Name | Date |
|--------|------|------|
| 528,893 | Shaw | Nov. 6, 1894 |

Certificate of Correction                                    March 8, 1949.

Patent No. 2,464,147.                JOSEPH W. MYERS

It is hereby certified that error appears in the printed specification of the above numbered patent requiring correction as follows:

Column 3, line 9, for "2,727 ohms" read *2.727 ohms*; and that the said Letters Patent should be read with this correction therein that the same may conform to the record of the case in the Patent Office.

Signed and sealed this 20th day of September, A. D. 1949.

[SEAL]

JOE E. DANIELS,
*Assistant Commissioner of Patents.*